United States Patent
Aravind et al.

(10) Patent No.: US 11,501,335 B1
(45) Date of Patent: *Nov. 15, 2022

(54) ZONE TRACKING SYSTEM AND METHOD

(71) Applicant: MODIV MEDIA, INC., Quincy, MA (US)

(72) Inventors: Saji Aravind, Burlington, MA (US); Matthew Volpi, Newton, MA (US); Satish Gopalakrishnan, Arlington, MA (US)

(73) Assignee: MODIV MEDIA, INC., Quincy, MA (US)

( * ) Notice: Subject to any disclaimer, the term of this patent is extended or adjusted under 35 U.S.C. 154(b) by 296 days.

This patent is subject to a terminal disclaimer.

(21) Appl. No.: 16/876,706

(22) Filed: May 18, 2020

Related U.S. Application Data

(63) Continuation of application No. 12/195,209, filed on Aug. 20, 2008, now Pat. No. 10,657,561.

(51) Int. Cl.
   *G06Q 30/00* (2012.01)
   *G06Q 30/02* (2012.01)

(52) U.S. Cl.
   CPC ..... *G06Q 30/0261* (2013.01); *G06Q 30/0267* (2013.01); *G06Q 30/0207* (2013.01)

(58) Field of Classification Search
   CPC .......... G06Q 30/0261; G06Q 30/0267; G06Q 30/0207
   See application file for complete search history.

(56) References Cited

U.S. PATENT DOCUMENTS

| | | | |
|---|---|---|---|
| 5,056,919 | A | 10/1991 | Arditty |
| 5,221,838 | A | 6/1993 | Gutman et al. |
| 5,591,949 | A | 1/1997 | Bernstein |
| 5,650,761 | A | 7/1997 | Gomm et al. |
| 5,727,153 | A | 3/1998 | Powell |
| 5,761,648 | A | 6/1998 | Golden et al. |

(Continued)

FOREIGN PATENT DOCUMENTS

| | | |
|---|---|---|
| JP | 2001-256398 | 9/2001 |
| JP | 2001-282796 | 10/2001 |

(Continued)

OTHER PUBLICATIONS

E.W.T. Ngai; K.K.L. Moon; James N.K. Liu; Tsang, K F; Law, R; F.F.C. Suk; l,C,L. Wong, Extending CRM in the Retail Industry: An RFID-Based Personal Shopping Assistant System, Association for Information Systems, Sep. 2008 (Year: 2008).*

(Continued)

*Primary Examiner* — Matthew L Hamilton
(74) *Attorney, Agent, or Firm* — McDermott Will & Emery LLP

(57) ABSTRACT

A system and method of zone tracking for delivery of media to customers within a store is disclosed. Zone tracking enables targeting of media to at least one electronic device both in the presence of as well as in the absence of customer triggers by monitoring the physical location of the electronic device associated with the customer in the store. The zone tracking system and method preferably use a combination of at least one location-tracking server and at least one access point to track a customer's present location within a store as well as items in the vicinity of the customer.

20 Claims, 5 Drawing Sheets

(56) References Cited

U.S. PATENT DOCUMENTS

| | | |
|---|---|---|
| 5,794,210 A | 8/1998 | Goldhaber et al. |
| 5,857,175 A | 1/1999 | Day et al. |
| 5,887,271 A | 3/1999 | Powell |
| 5,915,023 A | 6/1999 | Bernstein |
| 5,918,211 A | 6/1999 | Sloane |
| 5,943,624 A | 8/1999 | Fox et al. |
| 5,970,469 A | 10/1999 | Scroggie et al. |
| 5,979,757 A | 11/1999 | Tracy et al. |
| 6,006,265 A | 12/1999 | Rangan et al. |
| 6,014,635 A | 1/2000 | Harris et al. |
| 6,055,513 A | 4/2000 | Katz et al. |
| 6,076,068 A | 6/2000 | DeLapa et al. |
| 6,088,683 A | 7/2000 | Jalili |
| 6,169,890 B1 | 1/2001 | Vatanen |
| 6,223,291 B1 | 4/2001 | Puhi et al. |
| 6,237,145 B1 | 5/2001 | Narasimhan et al. |
| 6,282,522 B1 | 8/2001 | Davis et al. |
| 6,332,126 B1 | 12/2001 | Peirce et al. |
| 6,353,739 B1 | 3/2002 | Davis |
| 6,386,450 B1 | 5/2002 | Ogasawara |
| 6,389,401 B1 | 5/2002 | Kepecs |
| 6,450,407 B1 | 9/2002 | Freeman et al. |
| 6,601,040 B1 | 7/2003 | Kolls |
| 6,647,269 B2 | 11/2003 | Hendrey et al. |
| 6,711,474 B1 | 3/2004 | Treyz et al. |
| 6,837,436 B2 | 1/2005 | Swartz et al. |
| 6,868,391 B1 | 3/2005 | Hultgren |
| 6,879,965 B2 | 4/2005 | Fung et al. |
| 6,912,398 B1 | 6/2005 | Domnitz |
| 6,931,254 B1 | 8/2005 | Egner et al. |
| 6,996,579 B2 | 2/2006 | Leung et al. |
| 7,013,286 B1 | 3/2006 | Aggarwal et al. |
| 7,027,803 B2 | 4/2006 | Dafcik |
| 7,035,649 B1 | 4/2006 | Chang et al. |
| 7,096,205 B2 | 8/2006 | Hansen et al. |
| 7,116,977 B1 | 10/2006 | Moton et al. |
| 7,123,879 B2 | 10/2006 | Koketsu et al. |
| 7,127,261 B2 | 10/2006 | Van Erlach |
| 7,127,264 B2 | 10/2006 | Hronek et al. |
| 7,221,949 B2 | 5/2007 | Clough |
| 7,239,871 B2 | 7/2007 | Shamp et al. |
| 7,248,855 B2 | 7/2007 | Joyce et al. |
| 7,305,365 B1 | 12/2007 | Bhela et al. |
| 7,506,804 B2 | 3/2009 | Zajkowski et al. |
| 7,668,754 B1 | 2/2010 | Bridgetall |
| 7,684,809 B2 | 3/2010 | Niedermeyer |
| 7,865,414 B2 | 1/2011 | Fung et al. |
| 7,917,388 B2 | 3/2011 | van der Riet |
| 8,032,409 B1 | 10/2011 | Mikurak |
| 8,065,235 B2 | 11/2011 | Narayanaswami et al. |
| 8,626,130 B2 | 1/2014 | Wesley |
| 8,783,561 B2 | 7/2014 | Wesley |
| 8,825,523 B2 | 9/2014 | Gillenson et al. |
| 9,224,154 B2 | 12/2015 | Wesley |
| 2001/0001239 A1 | 5/2001 | Stewart |
| 2001/0005840 A1 | 6/2001 | Verkama |
| 2001/0007983 A1 | 7/2001 | Lee |
| 2001/0018666 A1 | 8/2001 | Sugiyama et al. |
| 2001/0051876 A1 | 12/2001 | Seigel et al. |
| 2002/0029342 A1 | 3/2002 | Keech |
| 2002/0035539 A1 | 3/2002 | O'Connell |
| 2002/0060246 A1 | 5/2002 | Gobburu et al. |
| 2002/0062249 A1 | 5/2002 | Iannacci |
| 2002/0077907 A1 | 6/2002 | Ukai et al. |
| 2002/0091569 A1 | 7/2002 | Kitaura et al. |
| 2002/0091571 A1 | 7/2002 | Thomas et al. |
| 2002/0095333 A1 | 7/2002 | Jokinen et al. |
| 2002/0101993 A1 | 8/2002 | Eskin |
| 2002/0115449 A1 | 8/2002 | Allen |
| 2002/0128908 A1 | 9/2002 | Levin et al. |
| 2002/0133467 A1 | 9/2002 | Hobson et al. |
| 2002/0138372 A1 | 9/2002 | Ludtke |
| 2002/0143655 A1 | 10/2002 | Elston et al. |
| 2002/0147642 A1 | 10/2002 | Avallone et al. |
| 2002/0151313 A1 | 10/2002 | Stead |
| 2002/0165803 A1 | 11/2002 | Iwase et al. |
| 2002/0183070 A1 | 12/2002 | Bloebaum et al. |
| 2003/0004827 A1 | 1/2003 | Wang |
| 2003/0014330 A1 | 1/2003 | Showghi et al. |
| 2003/0028483 A1 | 2/2003 | Sanders et al. |
| 2003/0028518 A1 | 2/2003 | Mankovv |
| 2003/0036950 A1 | 2/2003 | Nguyen |
| 2003/0083933 A1 | 5/2003 | McAlear |
| 2003/0100315 A1 | 5/2003 | Rankin |
| 2003/0115070 A1 | 6/2003 | Brown et al. |
| 2003/0120592 A1 | 6/2003 | Ng |
| 2003/0125958 A1 | 7/2003 | Alpdemir et al. |
| 2003/0155413 A1 | 8/2003 | Kovesdi et al. |
| 2003/0162536 A1 | 8/2003 | Panico |
| 2003/0191709 A1 | 10/2003 | Elston et al. |
| 2003/0229541 A1 | 12/2003 | Randall et al. |
| 2003/0233278 A1 | 12/2003 | Marshall |
| 2003/0233557 A1 | 12/2003 | Zimmerman |
| 2004/0002897 A1 | 1/2004 | Vishik |
| 2004/0023666 A1 | 2/2004 | Moon et al. |
| 2004/0029570 A1 | 2/2004 | Knorr et al. |
| 2004/0064406 A1 | 4/2004 | Yates et al. |
| 2004/0083170 A1 | 4/2004 | Bam et al. |
| 2004/0098350 A1 | 5/2004 | Labrou et al. |
| 2004/0128197 A1 | 7/2004 | Bam et al. |
| 2004/0215467 A1 | 10/2004 | Coffman et al. |
| 2004/0227617 A1 | 11/2004 | Vasquez et al. |
| 2004/0236689 A1 | 11/2004 | Matsuyama |
| 2004/0249712 A1 | 12/2004 | Brown et al. |
| 2004/0260608 A1 | 12/2004 | Lewis et al. |
| 2005/0021399 A1 | 1/2005 | Postrel |
| 2005/0021401 A1 | 1/2005 | Postrel |
| 2005/0071240 A1 | 3/2005 | Ewald |
| 2005/0170850 A1 | 8/2005 | Edwards et al. |
| 2005/0187873 A1 | 8/2005 | Labrou et al. |
| 2005/0216354 A1 | 9/2005 | Bam et al. |
| 2005/0251442 A1 | 11/2005 | Ficalora |
| 2005/0256726 A1 | 11/2005 | Benson et al. |
| 2006/0000900 A1 | 1/2006 | Fernandes et al. |
| 2006/0004626 A1 | 1/2006 | Holmen |
| 2006/0020507 A1 | 1/2006 | Sagey |
| 2006/0059040 A1 | 3/2006 | Eldred et al. |
| 2006/0089792 A1 | 4/2006 | Manber et al. |
| 2006/0091203 A1 | 5/2006 | Bakker et al. |
| 2006/0092072 A1* | 5/2006 | Steiner ............... G06Q 30/0241 340/8.1 |
| 2006/0099964 A1 | 5/2006 | Barrese et al. |
| 2006/0099965 A1 | 5/2006 | Aaron |
| 2006/0105783 A1 | 5/2006 | Giraldin et al. |
| 2006/0138219 A1 | 6/2006 | Brzezniak et al. |
| 2006/0143091 A1 | 6/2006 | Yuan et al. |
| 2006/0169771 A1 | 8/2006 | Brookner |
| 2006/0171382 A1 | 8/2006 | Mohri et al. |
| 2006/0178986 A1 | 8/2006 | Giordano et al. |
| 2006/0194569 A1 | 8/2006 | Hsueh |
| 2006/0194592 A1 | 8/2006 | Clough |
| 2006/0195359 A1 | 8/2006 | Robinson |
| 2006/0248016 A1 | 11/2006 | Ginter et al. |
| 2007/0050259 A1 | 3/2007 | Wesley |
| 2007/0087761 A1 | 4/2007 | Anjum et al. |
| 2007/0150334 A1 | 6/2007 | Bergh et al. |
| 2007/0156517 A1 | 7/2007 | Kaplan et al. |
| 2007/0162341 A1 | 7/2007 | McConnell et al. |
| 2007/0173266 A1 | 7/2007 | Barnes, Jr. |
| 2007/0198334 A1 | 8/2007 | Mebruer |
| 2007/0260521 A1 | 11/2007 | Van Der Riet |
| 2008/0004888 A1 | 1/2008 | Davis et al. |
| 2008/0011825 A1 | 1/2008 | Giordano et al. |
| 2008/0070572 A1 | 3/2008 | Shkedi |
| 2008/0074264 A1 | 3/2008 | Sharpe et al. |
| 2008/0097844 A1 | 4/2008 | Hsu et al. |
| 2008/0143482 A1 | 6/2008 | Shoarinejad et al. |
| 2008/0153478 A1 | 6/2008 | Walter |
| 2008/0243626 A1 | 10/2008 | Starwar et al. |
| 2008/0270249 A1 | 10/2008 | Rosenbaum et al. |
| 2008/0306820 A1 | 12/2008 | Passmore |
| 2009/0088203 A1 | 4/2009 | Havens et al. |
| 2009/0096628 A1 | 4/2009 | Moscovitch |
| 2009/0177536 A1 | 7/2009 | Alexander et al. |

(56) References Cited

U.S. PATENT DOCUMENTS

| | | |
|---|---|---|
| 2009/0177540 A1 | 7/2009 | Quatse |
| 2009/0111484 A1 | 8/2009 | Kock et al. |
| 2009/0265220 A1 | 10/2009 | Bayrakter et al. |
| 2009/0281895 A1 | 11/2009 | Selinger et al. |
| 2009/0286553 A1 | 11/2009 | Northway et al. |
| 2009/0299857 A1 | 12/2009 | Brubaker |
| 2010/0125495 A1 | 5/2010 | Smith et al. |
| 2010/0198678 A1 | 8/2010 | Burst et al. |
| 2011/0029355 A1 | 2/2011 | Hann |
| 2011/0029362 A1 | 2/2011 | Roeding et al. |
| 2011/0040625 A1 | 2/2011 | Woodruff et al. |
| 2011/0047017 A1 | 2/2011 | Lieblang et al. |
| 2011/0047023 A1 | 2/2011 | Lieblang et al. |
| 2011/0191237 A1 | 8/2011 | Faith et al. |
| 2011/0231242 A1 | 9/2011 | Dilling et al. |
| 2011/0231253 A1 | 9/2011 | Crawford et al. |
| 2011/0251880 A1 | 10/2011 | Butler et al. |
| 2012/0022930 A1 | 1/2012 | Brouhard |
| 2012/0022944 A1 | 1/2012 | Volpi |
| 2012/0089461 A1 | 4/2012 | Greenspan |
| 2012/0215610 A1 | 8/2012 | Amaro et al. |
| 2013/0003575 A1 | 1/2013 | Konishi et al. |
| 2013/0030901 A1 | 1/2013 | Eichstaedt et al. |
| 2013/0275217 A1 | 10/2013 | Ramchandani |
| 2013/0290096 A1 | 10/2013 | Lizotte, III |
| 2014/0122114 A1 | 5/2014 | Wesley |
| 2014/0244207 A1 | 8/2014 | Hicks |
| 2014/0330631 A1 | 11/2014 | Wesley |
| 2016/0110753 A1 | 4/2016 | Wesley |

FOREIGN PATENT DOCUMENTS

| | | |
|---|---|---|
| JP | 2003-515228 | 4/2003 |
| JP | 2003-196529 | 7/2003 |
| JP | 2005-215846 | 8/2005 |
| JP | 2006-209280 | 8/2006 |
| JP | 2008-191905 | 8/2008 |
| JP | 2009-510610 | 3/2009 |
| JP | 2009-69985 | 4/2009 |
| JP | 2010-061544 | 3/2010 |
| JP | 2010-066911 | 3/2010 |
| JP | 2012-507787 | 3/2012 |
| WO | 1998/34203 | 8/1998 |
| WO | 1999/33034 | 7/1999 |
| WO | 2002/13552 | 2/2002 |
| WO | 2002/080121 | 10/2002 |
| WO | 2010/062367 A1 | 6/2010 |
| WO | 2013/009989 | 1/2013 |
| WO | 2013/033540 | 3/2013 |

OTHER PUBLICATIONS

Yashima, Ultimate Section of 42 must-have iPhone apps ranging from productivity and phot Apps to entertainment Apps by Editors of Weekly ASCII, Weekly ASCII, issued Jan. 19, 2010, Japan ASCII Media Works, Jan. 4, 2010, vol. 22, No. 767, pp. 72-77, together with partial English language translation.
European Office Action for EP App. No. 12812063.1 dated Nov. 2, 2017, 5 pages.
Japanese Office Action dated Jul. 26, 2016, which issued in Japanese Application No. 2014-528640, together with English translation.
Japanese Office Action dated Aug. 2, 2016, which issued in Japanese Application No. 2014-520327, together with English translation.
Japanese Notice of Allowance from Japanese Patent Application No. 2014-528640, dispatched on Sep. 12, 2017.
Japanese Office Action from Japanese Patent Application No. 2014-528640, dated Apr. 4, 2017.
Linkup Co Ltd., "Android App Super Bible," Socym Col. Ltd. Apr. 7, 2011, 1st Ed, p. 301.
International Search report issued for PCT/US03/33591, dated Jun. 13, 2005. 5 pages.
International Search report issued for PCT/US03/33432, dated Jun. 16, 2004. 1 page.
European Search Report issued for EP 05253915.2 dated Sep. 1, 2005, 3 pages.
European Search Report issued for EP 03777779.4 dated Mar. 29, 2006, 4 pages.
European Examination Report issued for EP 03809623.6 dated Aug. 3, 2006, 4 pages.
International Preliminary Report on Patentability dated Aug. 20, 2014 in corresponding International Patent Application No. PCT/US2012/046478, 10 pages.
U.S. Appl. No. 61/445,920, filed Feb. 23, 2011, to which Amaro et al., US 2012/0215610 (U.S. Appl. No. 13/396,536, filed Feb. 14, 2012) claims priority, 103 pages.
International Search Report and Written Opinion issued for PCT/US2007/072757, dated Jan. 28, 2008. 10 pages.
U.S. Appl. No. 10/646,579, filed Aug. 22, 2003, Bam et al., 48 pages.
U.S. Appl. No. 10/877,093, filed Jun. 25, 2004, Bam et al.
U.S. Appl. No. 10/691,459, filed Oct. 22, 2003, Bam et al., 36 pages.
U.S. Appl. No. 60/420,642, filed Oct. 23, 2002, Bam et al., 18 pages.
U.S. Appl. No. 60/420,643, filed Oct. 23, 2002, Bam et al., 14 pages.
Definition of Server from www.soft.com/eValid/Products/Documentation.7/Technical/definitions.html, http://www.google.com/search?sourceip=navclient&aq=t&ie=UTF-8&rls=GGLD,GGLD:2004-30, GGLD:en%q=define%3a+server, downloaded Oct. 14, 2018, 3 pages.

* cited by examiner

ZONE TRACKING SYSTEM AND METHOD

CROSS-REFERENCE TO RELATED APPLICATIONS

The present application is related to, and claims priority under 35 U.S.C. § 120 as a continuation, to U.S. patent application Ser. No. 12/195,209, entitled ZONE TRACKING SYSTEM AND METHOD, to Saji Aravind et al., and filed on Aug. 20, 2008, the disclosure of which is incorporated by reference in its entirety, for all purposes.

TECHNICAL FIELD

The present invention relates generally to tracking of customers inside a store and more specifically to zone tracking allowing a store to track customers and deliver offers to customers based on their location within a store.

BACKGROUND OF THE INVENTION

Given a choice of similar providers, consumers tend to patronize the merchant that provides the consumer more value for the same price, or the same value at a lower price. To influence a consumer's choice of providers, merchants often provide promotions, such as coupons, for goods such as groceries, consumer electronics, clothing, and other items. In this context, a coupon is a promotion used as a tool by merchants to encourage sales and/or loyalty, usually by lowering the price in some manner. For example, a coupon could be used for a discount on the product, to give the consumer a larger quantity (for example, 2 for 1) of a product or service, or a discount on a related product or future purchase. A coupon could also be used to credit purchases made by one person against a certain account. The possibilities for coupon usage are essentially unlimited.

Coupons and other promotions are often used by merchants as marketing tools designed and developed to encourage a change in purchase behavior, to retain valued customers and to induce repeat purchases. Traditional promotions have been paper-based, and usually have a cash or material purchase value, such as prepaid gift cards. Rather than being directed toward a single product, they may be an incentive to buy accessories associated with a particular item, or promotions may even be offers to sell. Overall, promotions serve to attract consumers to a store or to a particular product or brand in a store, as well as to bring attention to new products and to keep track of an individual consumer's buying habits.

Customers often do not fully consider the coupons or offers that they are exposed to prior to entering a store. For example, a customer may view a coupon in a newspaper circular but elect not to clip the coupon for later use in the store. This may be due to a variety of reasons, among others including, the customer does not recognize a present use for the coupon or does not think that he/she wants to take the take the time to clip the coupon. However, when the customer later enters the store, he/she may recognize a use for the previously viewed coupon but does not possess the coupon. In other circumstances, the store may want to influence a customer to purchase certain items, but other than lowering the price of the item and advertising that lower price, the store has limited options to change the behavior of the customer upon entry into the store, assuming the customer has not brought coupons with him/her to the store.

BRIEF SUMMARY OF THE INVENTION

An embodiment of the present invention is directed to systems for tracking movement of an electronic device associated with a customer through zones in a store. The system preferably comprises at least one access point and at least one location-tracking server. The at least one location-tracking server preferably matches signal strength information emitted by the at least one access point and transmitted by an electronic device to zones within the store and delivers offers to the electronic device based on the matching. The system preferably utilizes an 802.11 wireless network to identify zones based on the signal strength information transmitted from the electronic device. Embodiments of the at least one location-tracking server include a planogram database maintaining at least a record of the universal product codes (UPCs) for each item in the store and the corresponding location of the item within the store. When the electronic device transmits signal strength information and the UPC for an item in the store, the location-tracking server preferably delivers an offer to the electronic device relating to the zone associated with the UPC. The offer preferably is related to the zone in which the electronic device is located.

Further embodiments of the present invention are directed to methods for delivery of media to a customer through tracking of an electronic device associated with the customer. Media preferably comprises pre-targeted offers, real-time offers, promotions and advertisements. The method preferably comprises activating the electronic device, transmitting signal strength data from the electronic device to a location-tracking server and receiving the media on the electronic device by identifying the position of the electronic device using the signal strength data. Media may be delivered upon activation of the electronic device. The method may further comprise scanning an item using the electronic device and transmitting an identifier of the scanned item with signal strength data from the electronic device to the location-tracking server. The media received on the electronic device may be associated with the scanned item. The media also may be associated with a zone in the store where the scanned item is located. The electronic device also may preferably continuously transmits signal strength data to the location-tracking server. In other embodiments, the electronic device transmits signal strength data to the location-tracking server upon movement across zones in the store. The media received on the electronic device is preferably associated with the zone in which the electronic device is located. The electronic device also preferably transmits signal strength data to the location-tracking server after a predetermined period of time of inactivity.

Additional embodiments of the present invention are directed to a location-tracking server for identifying the position of an electronic device under control of a customer within a store. The location-tracking server preferably comprises at least one database that collects signal strength information associated with different zones within the store, and software that translates the signal strength information into an identification of the zone where the electronic device is located. The signal strength information may be preferably broadcast by at least one access point positioned within the zones in the store. The location-tracking server preferably matches the signal strength information with the zone and delivers media to the electronic device based on the location of the electronic device within the store. The location-tracking server also may comprise at least one database that includes planogram information for the store. The location-tracking server according to embodiments of the present invention identifies the zone within the store where the electronic device is positioned based on signal strength information transmitted from the electronic device.

The location-tracking server also may preferably transmits an offer to the electronic device that is associated with an item scanned by the customer using the electronic device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
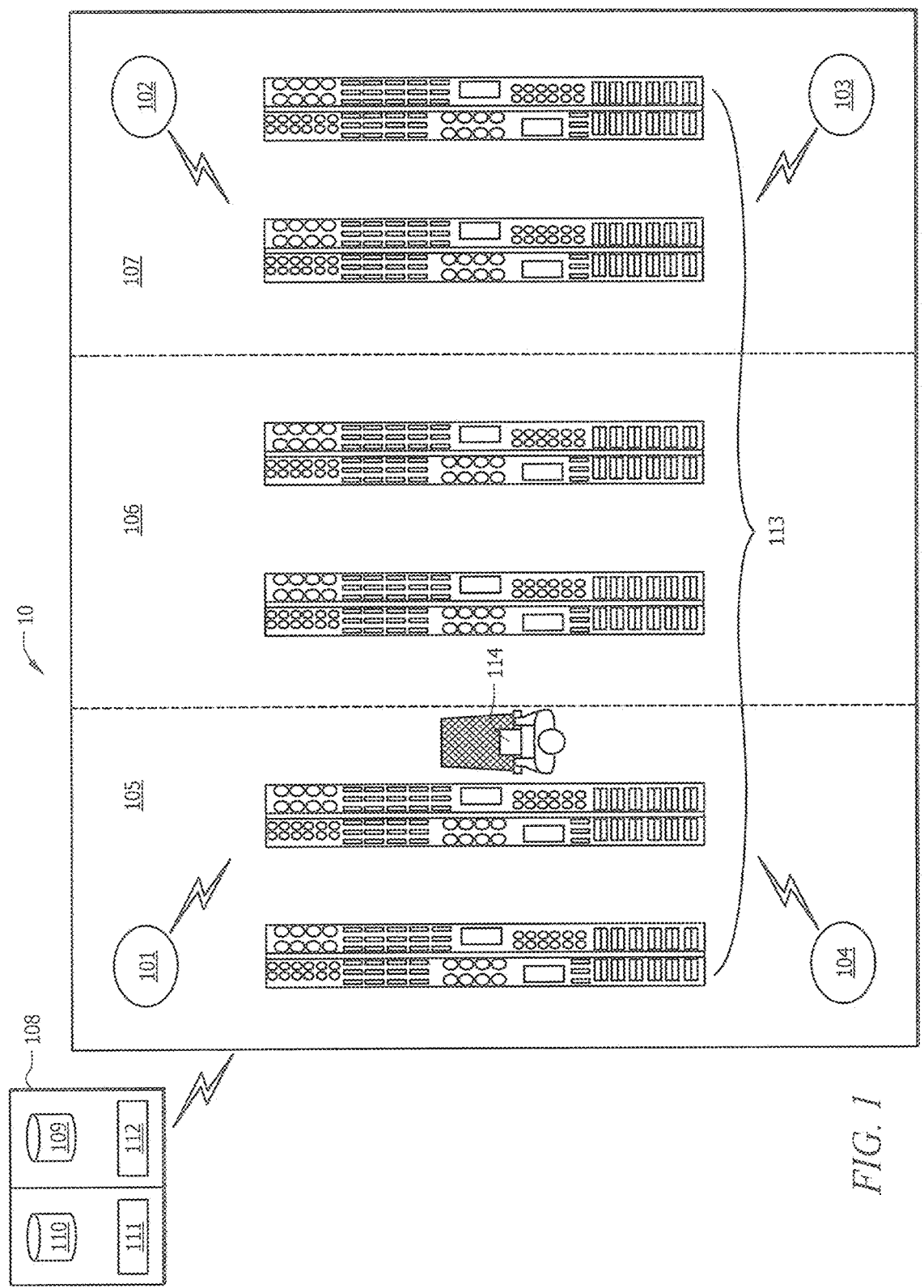
FIG. 1 illustrates a zone tracking system according to embodiments of the present invention.

The present invention is directed to a system and method of zone tracking for delivery of real-time targeted media to customers present in a store. Zone tracking uses the concept of "store geography" to enable media targeting both in the presence of as well as in the absence of customer triggers. The zone tracking system and method according to embodiments of the present invention preferably enables targeting of media to at least one electronic device within a store based upon the physical location of the at least one electronic device associated with a customer within the store. By tracking the customer's present location within the store, and thus the items in the vicinity of the customer, the zone tracking system and method of the present invention more accurately determines the best media to display to a customer at each given moment during the customer's shopping experience and increases the number of relevant media that the customer may be exposed to during a visit to the store.

According to embodiments of the present invention, the zone tracking system and method leverages upon a fingerprinting algorithm which has been developed to track wireless 802.11-based devices. An 802.11-based wireless network is preferably utilized for tracking the location of a customer in a store. Unlike other positioning systems, the zone tracking system and method preferably utilizes an 802.11 wireless network to identify a general area (also referred to as a zone as will be described in more detail below) within a store where the customer and the electronic device associated with the customer are presently located. More specifically, the customer moves around a store utilizing an electronic device and the zone tracking system and method according to embodiments of the present invention preferably tracks the location of the customer who is using an electronic device as he/she moves into different zones within the store. Upon identifying the location of a customer's electronic device, the zone tracking system and method of the present invention preferably delivers offers and advertisements to the customer's electronic device based on the present and/or estimated location of the electronic device in the store. While embodiments of the present invention have been discussed with respect to use of Wi-Fi or 802.11 networks, it should be appreciated that RFID, Bluetooth or cellular-type systems also may be used to determine location and deliver relevant offers based on location without departing from the objects of the present invention.

The zone tracking system and method according to embodiments of the present invention preferably employs a more sophisticated category of Wi-Fi location tracking preferably utilizing an 802.11 wireless network, sometimes referred to as RF fingerprinting. RF fingerprinting is based on sampling and recording of radio signal behavior patterns in specific environments. The strength and distance relationship of an RF signal is affected by the environment, including but not limited to geometry of the location, objects, human traffic, mirrors, windows, weather conditions, placement of access points, the make and model of the radio and even the time of day. RF fingerprinting preferably uses intelligent algorithms to improve location-tracking precision by accounting for these environmental effects on the wireless signal that may create attenuation and multi-path problems in the delivery of information over wireless networks.

FIG. 1 illustrates zone tracking system 10 according to embodiments of the present invention. A typical store utilizing zone tracking system 10 is divided into several zones, generally left zone 105, middle zone 106 and right zone 107. A zone is preferably a group of neighboring aisles within a store. For example, aisles 10-16 may be classified as a zone. It should be appreciated that the size of a zone may vary depending on the size of the store and the placement of access points (devices that allow wireless communication devices to connect to a wireless network) providing signal strength information within a zone as will be discussed in more detail below. Access points (101, 102, 103, 104) are distributed in at least the corners of the store and preferably span across zones (105, 106, 107). Moreover, it is preferable that access points (101, 102, 103, 104) are distributed throughout the store to monitor signal strengths of electronic device 114 as it moves up and down aisles 113 during a shopping visit. The zone tracking system and method according to embodiments of the present invention utilizes at least one access point but it should be appreciated that zone tracking system 10 may accommodate as many access points as the store may desire.

At least one location-tracking server 108 is preferably utilized in the zone tracking system and method according to embodiments of the present invention. Location-tracking server 108 preferably includes software 111 that communicates with electronic device 114 being utilized by a customer within the store. Software 111 preferably listens to 802.11 signals emitted by electronic device 114 moving around the store on a periodic basis. Location-tracking server 108 preferably includes database 110 that collects signal strength information associated with different positions within the store. This database preferably creates an RF fingerprint for each zone (105, 106, 107) of the store and records how each access point views an area in the store from a signal strength perspective. This data can later be utilized to ensure more accurate and immediate delivery of offers and advertisements to the customer associated with electronic device 114 within the store.

Location-tracking server 108 also preferably includes server software 112 which translates the signal data collected from electronic device 114 into an identification of the zone (105, 106, 107) associated with the collected signal data. Each electronic device 114 reports signal strength data to location-tracking server 108, and server software 112 then translates this data into an identification of a zone location on a continuous basis. In a preferred embodiment, this translation is preferably performed every 10 seconds. Accordingly, location-tracking server 108 takes into account the variances between the environment and electronic device 114 moving around the store, such as antenna characteristic differences between each electronic device as well as wireless signal differences within the store measured at different times of day and different days of the week.

A store preferably has a map (often referred to as a planogram) that permits identification of the location of items within the store. The planogram preferably includes information including, but not limited to, aisle number, shelf number, section of aisle, the product description and the bar code for the item. This data is typically used by a store to allocate shelf space for product vendors. A typical planogram data file consists of a list of 60-70% of the universal product codes (UPCs) carried by the store. Location-tracking server 108 also preferably includes database 109 containing the planogram for the store. Planogram database 109 preferably maintains at least information about the UPCs for each item within the store and the corresponding aisle number for the item. Based on this planogram data, when a customer scans a UPC, zone tracking system 10 will preferably be able to locate the aisle 113 where the customer is shopping as well as the item that the customer has scanned.

A "fingerprint" of the specific wireless environment in a store is calculated by a physical walk-around using a hand-held spectrum analysis device during the "setup" phase. While the zone tracking system is in "learning" mode during the "setup" phase, an item is scanned and the item description and signal strength are preferably sent to location-tracking server 108. The data collected during the "setup" phase is preferably later compared to deviations in the real-time environment to allow the zone tracking system to later be able to locate an electronic device associated with a customer within the store. Thus, data collected, including signal strength and product information, is stored in respective databases 109, 110 on location-tracking server 108 for later use to identify offers associated with a particular zone (105, 106, 107) containing a certain item. As more data is collected, zone tracking system 10 better learns the zone and product locations providing for more accurate delivery of advertisements and offers to a customer shopping in the store.

Deployment of an RF fingerprinting-based zone tracking system according to embodiments of the present invention is preferably divided into two phases: (1) the fingerprinting phase; and (2) the operating phase. During the fingerprinting phase, data is accumulated by performing a walk-around of the store with electronic device 114. Electronic device 114 samples and collects the signal strength data from multiple access points (101, 102, 103, 104). Preferably, one data reading may be taken from each zone (105, 106, 107). For each access point, electronic device 114 records the signal strength associated with the access point along with the location of electronic device 114 as well as the MAC address associated with each access point. Accordingly, the data readings preferably indicate the signal strength at each access point (101, 102, 103, 104) within each zone (105, 106, 107). The signal strength associated with each access point typically decreases by distance from location-tracking server 108 which is recording the data readings, although it should be appreciated that the decrease in distance is not required to be linear.

During the initial store setup, the aisle information from planogram database 109 developed for the store is used to create zones (105, 106, 107). Each zone represents an area in the store large enough to distinguish the signal strength variations between access points (101, 102, 103, 104) positioned in different parts of a store. Thus, between two neighboring zones, there preferably would be a noticeable difference in the signal strengths associated with the access points. Access points are preferably positioned in an even distribution throughout the store to cover the square footage of the entire store. Access points are generally placed in such a way that, from any point in the store, electronic device 114 can "see" at least three access points at any given point in time. For example, there may be one access point in every corner of a 5000 square foot store. Depending on the size of the store and the number of access points to be deployed, the zones associated with a store may be smaller in size. For example, a store of 65,000 square feet may preferably be divided into 3-12 different zones.

In the operational phase, a customer walks around the store with electronic device 114 which has already been fingerprinted during the fingerprinting phase. The customer preferably uses electronic device 114 to scan items. While the customer walks around aisles 113 within the store, electronic device 114 associated with the customer preferably engages in periodic measurements of the signal strengths from all of the access points (101, 102, 103, 104) and forwards that information to location-tracking server 108. Location-tracking server 108 preferably uses a positioning algorithm as well as fingerprinting database 110 built during the fingerprinting phase to estimate the location of electronic device 114 within the store. The zone (105, 106, 107) associated with the present position of electronic device 114 is derived from fingerprint database 110 as well as the current signal strength recorded by electronic device 114. Accordingly, electronic device 114 preferably sends signal strength data to location-tracking server 108 to communicate the present zone location of electronic device 114.

Using the signal strengths reported from each of the access points in proximity to electronic device 114, location-tracking server 108 compares the data recorded by electronic device 114 with the previously reported fingerprint data for electronic device 114 contained in fingerprinting database 110. The positioning algorithm then preferably assesses each data point sent by electronic device 114 in order to find the best match and accordingly identify the current location (zone) of electronic device 114. Electronic device 114 preferably uses a Euclidian deterministic algorithm to find the minimum statistical signal distance between a detected signal strength location vector and the location vectors of the various fingerprinted sample points, although other similar algorithms may be utilized without departing from the objects of the present invention. The sample point with the minimum statistical signal distance between itself and the detected location vector is preferably regarded as the most likely estimate of the present location of electronic device 114. Once the zone location for electronic device 114 is determined, zone tracking system 10 according to embodiments of the present invention preferably checks relevant offers for the identified zone (105, 106 or 107) and delivers those offers to the customer's electronic device 114.

Figure 2:
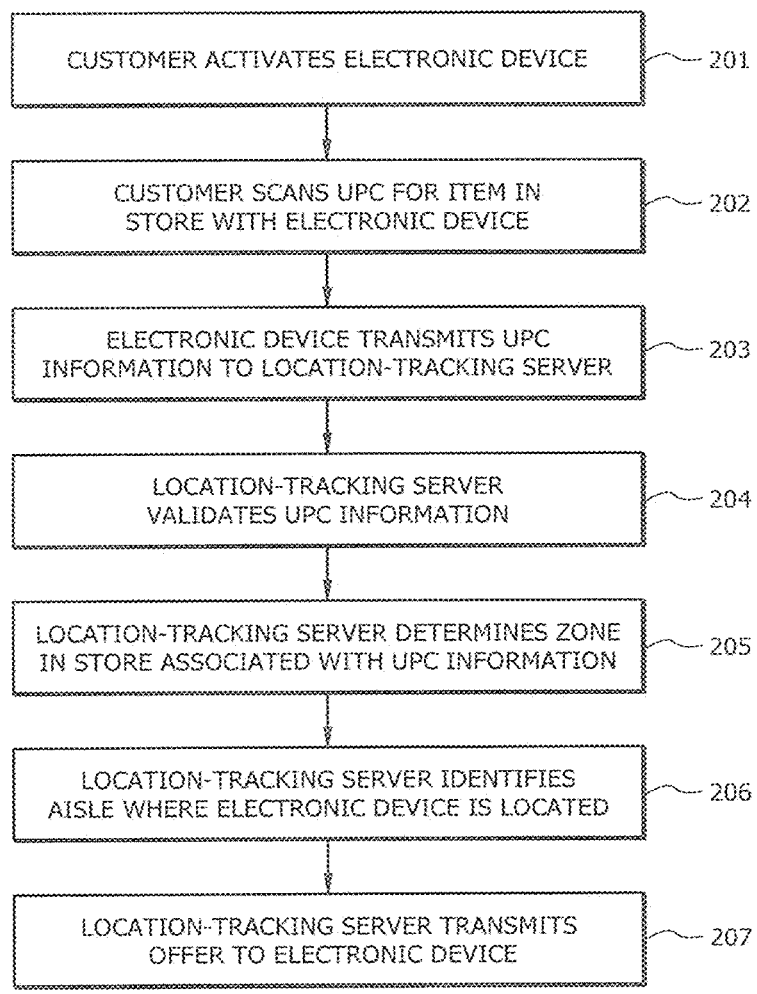
FIG. 2 illustrates a method of zone tracking according to embodiments of the present invention.

There are several ways in which a zone associated with an item may be located within the store and an offer may be sent to the electronic device utilizing the zone tracking system and method according to embodiments of the present invention. In a first embodiment of the zone tracking method, as illustrated in FIG. 2, an electronic device is activated by the customer (step 201), and the customer uses the electronic device to initiate a scan of the UPC for a selected item within the store (step 202). Upon scanning the UPC for the item, the electronic device preferably transmits UPC information for the item to the location-tracking server (step 203). In this embodiment, the electronic device also preferably transmits the signal strength of every access point in and around the scanned item to the location-tracking server, thereby further adding to the database of zones and associated signal strengths housed within the location-tracking server.

The location-tracking server preferably validates the UPC information (step 204). The location-tracking server determines the zone in the store associated with the UPC information for the item using the planogram database housed within the location-tracking server (step 205). The location-tracking server identifies the aisle where the electronic device is located based on the planogram data stored on the location-tracking server (step 206). Based on the planogram data, the zone is identified and combined with the signal strength of the access point to form a fingerprint data point. It should be appreciated that this type of data point collection should preferably be performed each time a customer scans an item. The location-tracking server preferably then transmits an offer to the electronic device that is either related to the item associated with the UPC just scanned or for other products within the zone where the scanned item is located (step 207).

Figure 3:
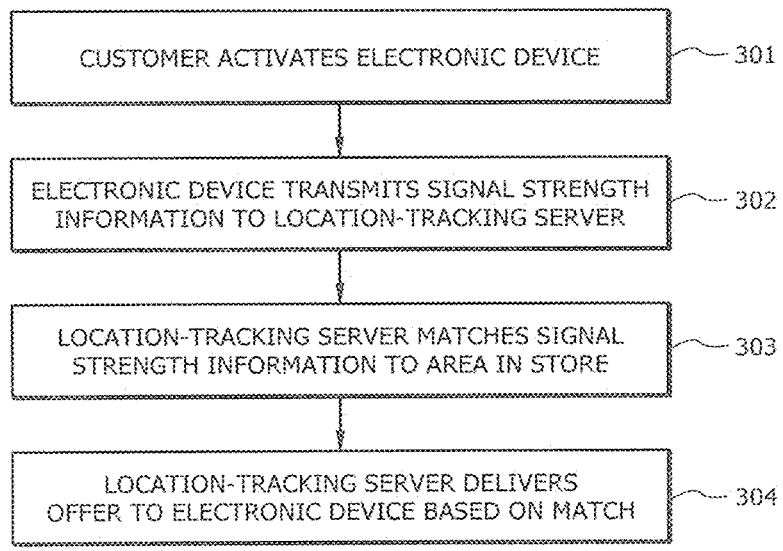
FIG. 3 illustrates another method of zone tracking according to embodiments of the present invention.

In another embodiment of zone tracking method according to the present invention as illustrated in FIG. 3, the electronic device is activated by the customer (step 301), but the customer does not initiate any scan at the time of activation. In this embodiment, the electronic device continuously transmits signal strength information (also sometimes referred to as the RF fingerprint) to the location-tracking server for the zone tracking system (step 302). The location-tracking server then preferably uses statistical algorithms to find the best matching area in the store corresponding to the signal strength data transmitted by the electronic device (step 303). If a matching area is found, the location-tracking server preferably makes a prediction about the zone where the electronic device is present positioned and thus delivers an offer related to the zone, if such an offer exists (step 304). If a matching zone is not found, then the location-tracking server preferably still delivers offers to the electronic device but it is unlikely that the offers will be zone-specific, as the location-tracking server was not able to locate the position of the electronic device within a particular zone in the store at the time of transmittal of the signal strength information.

According to embodiments of the present invention, when a customer releases an electronic device upon entry into a store, the customer preferably will receive an offer within their first minute of usage. This offer will preferably be the highest-ranked pre-targeted offer for that customer, regardless the customer's present location within the store. This is done to instantly initiate the customer to use of the electronic device as well as to demonstrate the potential money-saving aspects of utilizing the electronic device within the store.

Figure 4:
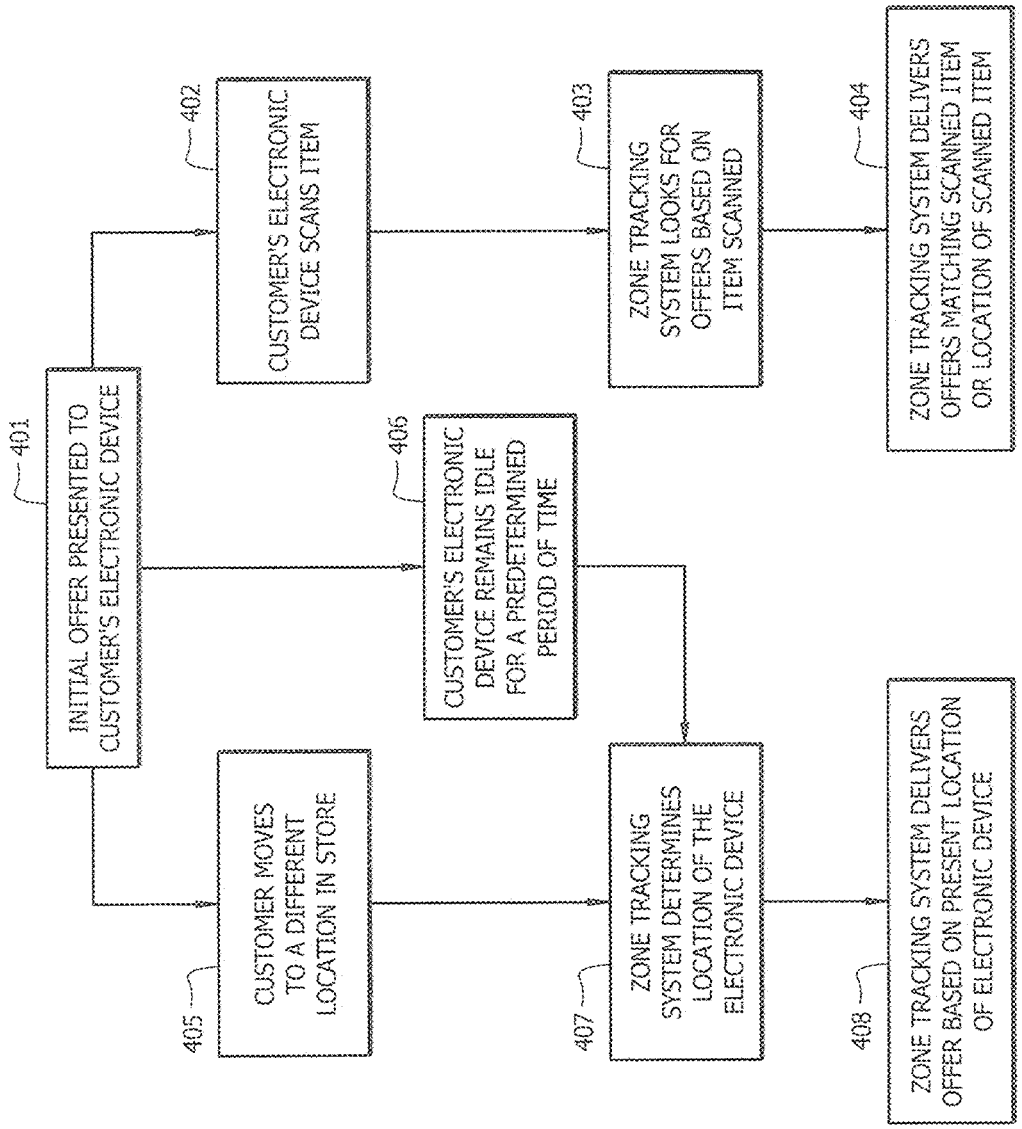
FIG. 4 illustrates another method of zone tracking according to embodiments of the present invention.

FIG. 4 illustrates various methods for zone tracking of an electronic device associated with a customer upon presentation of an initial offer to the customer's electronic device (step 401). Several events may trigger the zone tracking system to determine if there are relevant advertisements or offers to be delivered to the customer at any given time. For example, the customer may use his/her electronic device to scan a bar code (step 402) and that scanning event may trigger the zone tracking system to look for advertisements or offers for that customer based on the item scanned (step 403). Similarly, the zone tracking system may identify the location within the store where the customer appears to be scanning items and then deliver an advertisement or offer related to the zone or area of the store where the customer is scanning items. Accordingly, the zone tracking system delivers offers matching the scanned item or the location of the scanned item (step 404).

In another embodiment, there may be a setting associated with the electronic device that triggers a search by the zone tracking system when there have been no scan events over a predetermined period of time (i.e., the electronic device remains idle for a predetermined period of time) (step 406). Additionally or alternatively, the customer may move from one location to another within the store (step 405), and the customer's electronic device reports signal strengths from several access points to the location-tracking server. Based on this signal strength data and/or a predefined setting on the electronic device, the location-tracking server that forms part of the zone tracking system determines the present location of the electronic device (step 407) and then delivers an offer based on that present location of the electronic device (step 408). Thus, even when the customer is not scanning any items, the location of the customer may still be reported to the location-tracking server. Such tracking preferably allows targeting of a particular offer when the customer passes the aisle where the offer would be valid (i.e., targeting a Coke offer when the customer passes the soft drink aisle). Accordingly, the zone tracking system and method according to embodiments of the present invention does not always require manual actions (such as scanning) by the customer utilizing an electronic device within the store to enable zone tracking. Thus, the zone tracking system and method according to embodiments of the present invention allow the customer to receive offers based on location within the store as well as the customer's transaction history and offer inventory available from the store and/or CPG companies.

It should be appreciated that different types of offers are contemplated by the present invention. A pre-targeted offer is a 1:1 offer typically targeted based on purchase history. Real-time media is an offer or promotional message targeted based on in-store behavior that trip (location, scanned item, etc). It also should be appreciated that the advertisement or offer may be delivered to the customer's electronic device utilizing a variety of criteria. For example, in some embodiments of the present invention, an advertisement or offer may be delivered over a specified time frame based on an analysis of the customer's transaction history. Additionally or alternatively, an offer or advertisement may be delivered based on an analysis of prior offers delivered to the customer's electronic device during the present store visit.

Figure 5:
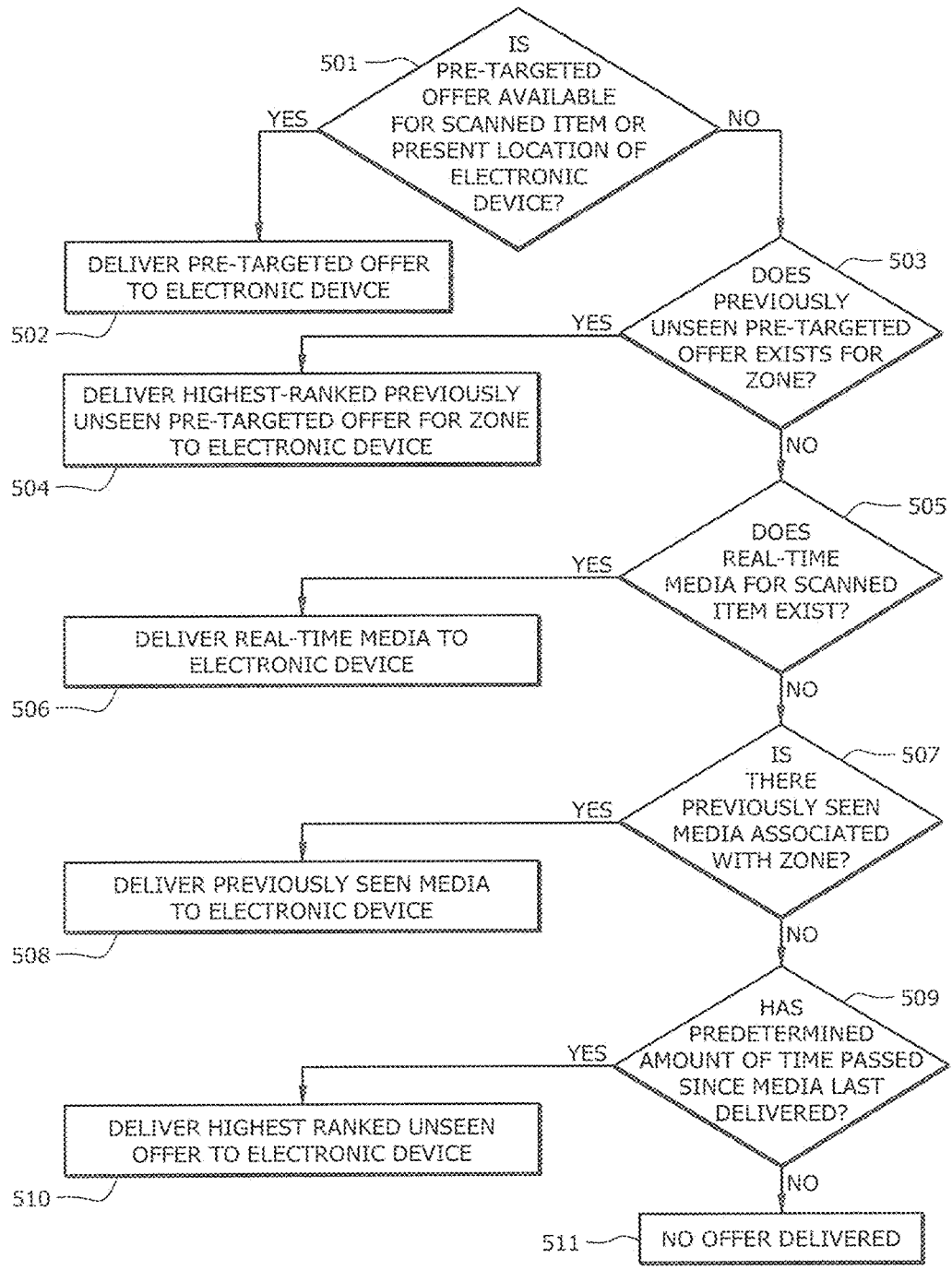
FIG. 5 illustrates methods for distributing offers based on zone tracking according to embodiments of the present invention.

Turning to FIG. 5, when events associated with the customer's electronic device occur (i.e., scanning, idling or other movement), the zone tracking system determines whether a pre-targeted offer is available for the scanned item or the present location of the electronic device within the store (step 501). If a pre-targeted offer exists, that offer is delivered to the electronic device of the customer (step 502). If there is no pre-targeted offer, the system then determines whether a previously unseen pre-targeted offer exists for the zone in which the electronic device is located (step 503). If such an offer exists, then the highest-ranked previously unseen pre-targeted offer for that zone is preferably delivered to the electronic device of the customer (step 504). If there is no such offer, the system preferably determines whether there is real-time media associated with the scanned item (step 505). If real-time media exists, it is preferably delivered to the electronic device of the customer (step 506). However, if real-time media does not exist, the system preferably assesses whether there is any previously seen media associated with the zone in which the electronic device is presently positioned (step 507). If that media exists, it is delivered to the electronic device of the customer (step 508). Otherwise, the system determines whether a predetermined amount of time (i.e., 5 minutes) has passed since any new media was delivered to the customer's electronic device (step 509). If that predetermined amount of time has passed, the highest-ranked unseen offer is preferably delivered to the electronic device of the customer (step 510) but otherwise, no offers are delivered to the customer's electronic device (step 511).

It should be appreciated that if offers are to be delivered based on movement of the customer's electronic device around the store, an offer may be delivered before the customer is about to enter a zone, at the time when the customer enters a zone and/or after the customer scans an item within a zone. The zone tracking system and method according to embodiments of the present invention allows prediction of zones where the customer's electronic device is located and the delivery of offers based on tracking of the zones. Moreover, the zone tracking system and method preferably predicts the customer's direction of movement within the store and identifies the zone in which the customer may be moving (i.e., based on the last four items scanned).

Further, it should be appreciated that the offers to be delivered to a customer may be in the same or in a different category as an item that has been scanned using the electronic device. For example, the customer may scan a cereal product and receive an upsell offer, such as an upgraded product or related item at the time that the customer selects the cereal product. Additionally or alternatively, the brand owner may want to introduce a new product to the customer. As an example, the customer may scan pasta sauce and get an offer for pasta.

It also should be appreciated that the signal strength measured at the same location by a electronic device over several trips around the store is not always static due to multi-path and other phenomena. Due to a variation in signal strength which may occur over time, many samples of data are preferably recorded for each location within the store. A typical data set may preferably include 20-25 data points per zone over various times of day. The signal strength measured by each electronic device also may vary depending on the make and model of the electronic device and radio being employed. Thus, it is preferable to collect data points for each electronic device that is in use within the store and maintain those data points within a database for later use by the zone tracking system according to embodiments of the present invention. Further, whenever the environment changes, such as by moving or replacing access points or by adding or removing objects such as shelves or tables, the fingerprint data may become obsolete and is preferably recollected to ensure accurate tracking of the zones within the store over time. This may be of particular importance if the store layout changes and/or new electronic devices are introduced to the system.

The zone tracking system may be tested and set into debug mode to allow system testers to see the device signal strength data and a small amount of zone calculation data on the device while the tester moves around the store floor. This preferably allows for troubleshooting of issues that may possibly occur when the zone tracking system is in operation. To perform such a debugging operation, a tester takes the electronic device off the rack and scans a zone tracking debug bar code. The electronic device typically displays a screen containing system date/time, as well as an identification of access points detected with signal strength and the distance to zones. Each time the electronic device queries the access points, it flashes an icon during the query duration and beeps to start the query. The tester exits the mode and return to the customer application. Functionality testing also may be performed, allowing the testers to open a simulator to manually set either access point signal strengths or specific zones to validate the functionality of the customer application.

It should be appreciated that it may require a period of time (as much as several weeks time) for the RF fingerprinting database utilized in the zone tracking system and method according to embodiments of the present invention to consistently map the coordinates from the RF fingerprint and link those coordinates to zones within the store because a threshold of data preferably needs to be collected to ensure consistency in zone tracking. However, once there is sufficient data, the zone tracking system according to embodiments of the present invention can continuously predict the location of an electronic device within the store with consistent accuracy, and thus deliver the right offers and hence a superior shopping experience to the customer.

Embodiments of the present invention provide for a zone tracking self-healing feature utilizing a combination of a retailer-provided planogram and customer scan data to improve the zone tracking signal strength map. Utilizing the customer scan data and the signal at the time of scanning, the system preferably may update its signal strength map as well as its UPC-to-zone mapping. To capture UPC/zone signal strength data, the electronic device reports access point signal strengths to the location-tracking server. The location-tracking server records the last signal strength with data/time for that particular electronic device. The customer then scans an item, and the electronic device archives the last signal strength data with the UPC of the customer scan data.

In order to execute the zone tracking self-healing feature, an algorithm is utilized that calculates the expected signal strength for the zone and for each UPC. For each UPC, the algorithm also summarizes the customer-scanned signal strengths for corresponding zones. For UPCs where the majority of the customer-scanned zones do not match the expected zone, the electronic device moves the UPC to the customer-scanned zone. For UPCs where the expected zone matches the majority of the customer-scanned zones, the electronic device updates the zone signal strength data to conform to the customer-scanned values. There may be many signal strengths recorded for a single item as the same access point may record different signal strengths associated with an item depending on the time of the day. Typically the system utilizes the last 10 recorded data points for the item. To adjust for time of the day, the system may, for example, utilize the best 10 data points for that time of day and that item and look for patterns within the data points collected.

It should be appreciated that the zone tracking system and method preferably allows electronic devices to be tracked and located within a zone of the store in as little as five seconds of the electronic device entering a specified location. The zone tracking system and method also are desirable as they preferably do not require any hardware or operating system modifications to the electronic devices that may already be in placed within a given store. Moreover, implementation of the zone tracking system and method according to embodiments of the present invention preferably does not impact the existing retailer merchandising space and does not interfere with existing infrastructure of a store, such as wireless or wired networks and lighting.

An embodiment of the electronic device utilized according to the present invention is device model MC17 manufactured by Symbol Technologies. The MC17 device is a self-scanning terminal that supports 320×240 QVGA color display and 802.11 b/g protocols for wireless connectivity. It is powered by rechargeable batteries that are recharged after every shopping trip when the MC17 device is inserted into its charging cradle and locked. The MC17 device preferably supports applications that provide the customer with the navigation to browse through aisles, scan or remove items scanned using the electronic device and finally receive advertisements or offers delivered to the device based on the location of the device within the store. The MC17 device communicates with the location-tracking server to identify its location and to display offers or advertisements.

The zone tracking system and method according to embodiments of the present invention provides an additional, unique target to trigger the display of ads and offers within a store. The store preferably may deliver offers to customers at more relevant moments, driving redemption of such offers. The zone tracking system and method preferably enables the electronic device to trigger delivery of ads to a customer based on the customer's in-store movements in addition to customer-initiated events (scanning or pressing a button). Customers appreciate the zone tracking system because it allows customers to save money as well as save time. From a customer's perspective, the zone tracking system and method according to embodiments of the present invention preferably improves the money-saving proposition by informing the customer of more offers at relevant moments than event-driven offer viewing alone. Use of zone tracking-driven offers can inform customers of offers that may not otherwise trigger based upon purchases contemplated during a store visit. Without the zone tracking system and method according to embodiments of the present invention, these offers, while relevant, would not display to the customer as near the moment of decision as may be desired by the store.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
    at least one database configured to store signal strength information comprising an association between a signal strength fingerprint and an access point whose location is known, and item location information indicating a location for a corresponding one of a plurality of items; and
    at least one processor programmed by computer program instructions that, when executed by the at least one processor, cause a server to:
    receive, from an electronic device, an indication of signal strength of the electronic device and an identification of an item scanned by the electronic device;
    obtain a location of the item in a store based on the identification of the item and an item location information;
    determine one or more zones at which the electronic device is located based on the indication of signal strength, the signal strength fingerprint, and the location of the item;
    identify at least one offer based on the one or more zones; and
    communicate the at least one offer to the electronic device based on the location of the electronic device at the one or more zones.

2. The system of claim 1, wherein the one or more zones are associated with an access point located at the one or more zones, and wherein a signal strength indicates a proximity of the electronic device to the access point.

3. The system of claim 1, wherein the at least one offer is identified based further on an analysis of one or more prior offers delivered to the electronic device.

4. The system of claim 1, wherein the at least one offer is identified based further on whether the at least one offer was previously unseen.

5. The system of claim 1, wherein the server is further programmed to determine a best match between the signal strength fingerprint and the indication of signal strength, wherein the one or more zones is based on the best match.

6. The system of claim 1, wherein the server is further programmed to:
    receive an indication that the electronic device has been activated; and
    prior to the indication of signal strength and the identification of the items scanned by the electronic device that is located at the one or more zones, communicate a pre-targeted offer to the electronic device wherein the pre-targeted offer is independent of the location of the electronic device.

7. The system of claim 1, wherein the server is further programmed to:
    determine a plurality of items that were last scanned by the electronic device; and predict a direction of movement of the electronic device based on the plurality of items that were last scanned, wherein the at least one offer is identified based on the direction of movement.

8. The system of claim 1, wherein the server is further programmed to predict a particular zone in which the electronic device will likely enter based on a direction of movement of the electronic device.

9. The system of claim 1, wherein the server is further programmed to communicate the at least one offer prior to the electronic device having entered a particular zone.

10. The system of claim 1, wherein the server is further programmed to store an identification of the electronic device in association with the indication of signal strength or the identification of the items scanned by the electronic device.

11. A method, comprising:
receiving, by a server, from an electronic device, an indication of signal strength and an identification of an item scanned by the electronic device that is located at one or more zones within a store;
obtaining by the server, item location information that indicates a location of one or more items in the store;
determining, by the server, one or more zones at which the electronic device is located based on the indication of signal strength, stored signal strength information, and a location of the item;
identifying, by the server, at least one offer based on the one or more zones; and
communicating, by the server, the at least one offer to the electronic device based on the location of the electronic device at the one or more zones.

12. The method of claim 11, wherein the one or more zones are associated with an access point located at the one or more zones, further comprising determining a proximity of the electronic device to the access point based on the indication of signal strength.

13. The method of claim 11, further comprising receiving the indication of signal strength when the electronic device moves from one zone to another zone or after a period of inactivity by the electronic device.

14. The method of claim 11, further comprising determining, by the server a best match between the stored signal strength information and the indication of signal strength, wherein the one or more zones is based on the best match.

15. The method of claim 11, further comprising:
storing an association of the location of the item scanned by the electronic device and an access point in the store;
receiving, from the electronic device or another electronic device, a second indication of a second signal strength between the electronic device or another electronic device and the access point; and
determining the location of the electronic device based on the association of the location of the item scanned by the electronic device and the access point.

16. The method of claim 11, further comprising:
receiving an indication that the electronic device has been activated; and
prior to the indication of signal strength and an identification of the item scanned by the electronic device that is located at the one or more zones, communicating a pre-targeted offer to the electronic device, wherein the pre-targeted offer is independent of the location of the electronic device.

17. The method of claim 11, further comprising:
determining a plurality of items that were last scanned by the electronic device: and
predicting a direction of movement of the electronic device based on the plurality of items that were last scanned, wherein the at least one offer is identified based on the direction of movement.

18. The method of claim 11, further comprising predicting a particular zone in which the electronic device will likely enter based on a direction of movement of the electronic device.

19. The method of claim 11, further comprising communicating the at least one offer prior to the electronic device having entered a particular zone.

20. The method of claim 11, further comprising storing an identification of the electronic device in association with the indication of signal strength or the identification of the item scanned by the electronic device.

* * * * *